United States Patent [19]
Hodson

[11] 4,225,357
[45] Sep. 30, 1980

[54] METHOD OF PRODUCING AND DISTRIBUTING A PERVIOUS CONCRETE PRODUCT

[76] Inventor: Harry Hodson, 4730 Dunn Dr., Sarasota, Fla. 33583

[21] Appl. No.: 19,152

[22] Filed: Mar. 9, 1979

[51] Int. Cl.$^2$ .............................................. C04B 7/02
[52] U.S. Cl. .......................................... 106/86; 106/97
[58] Field of Search ...................................... 106/86, 97

[56] References Cited
U.S. PATENT DOCUMENTS

| | | | |
|---|---|---|---|
| 2,130,498 | 9/1938 | Klemschofski et al. | 106/86 |
| 2,315,732 | 4/1943 | Patch | 106/86 |
| 2,793,957 | 5/1957 | Mangold | 106/86 |

*Primary Examiner*—James Poer
*Attorney, Agent, or Firm*—Arthur W. Fisher, III

[57] ABSTRACT

A pervious concrete product and method of formation, distribution and placing of the same which includes the pre-mixing of a predetermined quantity of cement and water, utilizing what may be defined as high energy techniques to accomplish a predetermined degree of hydration of the cement particles prior to the mixing of the resulting cementitious material batch with aggregate having a predetermined particle size so as to accomplish voids of a sufficient degree in the overall resulting concrete product. The concrete product is transported by suitable means which are mounted on and perform as part of a distributing, placing and finishing unit, developed to provide a uniform, durable and substantially planer surface to the final use of the concrete product.

8 Claims, 1 Drawing Figure

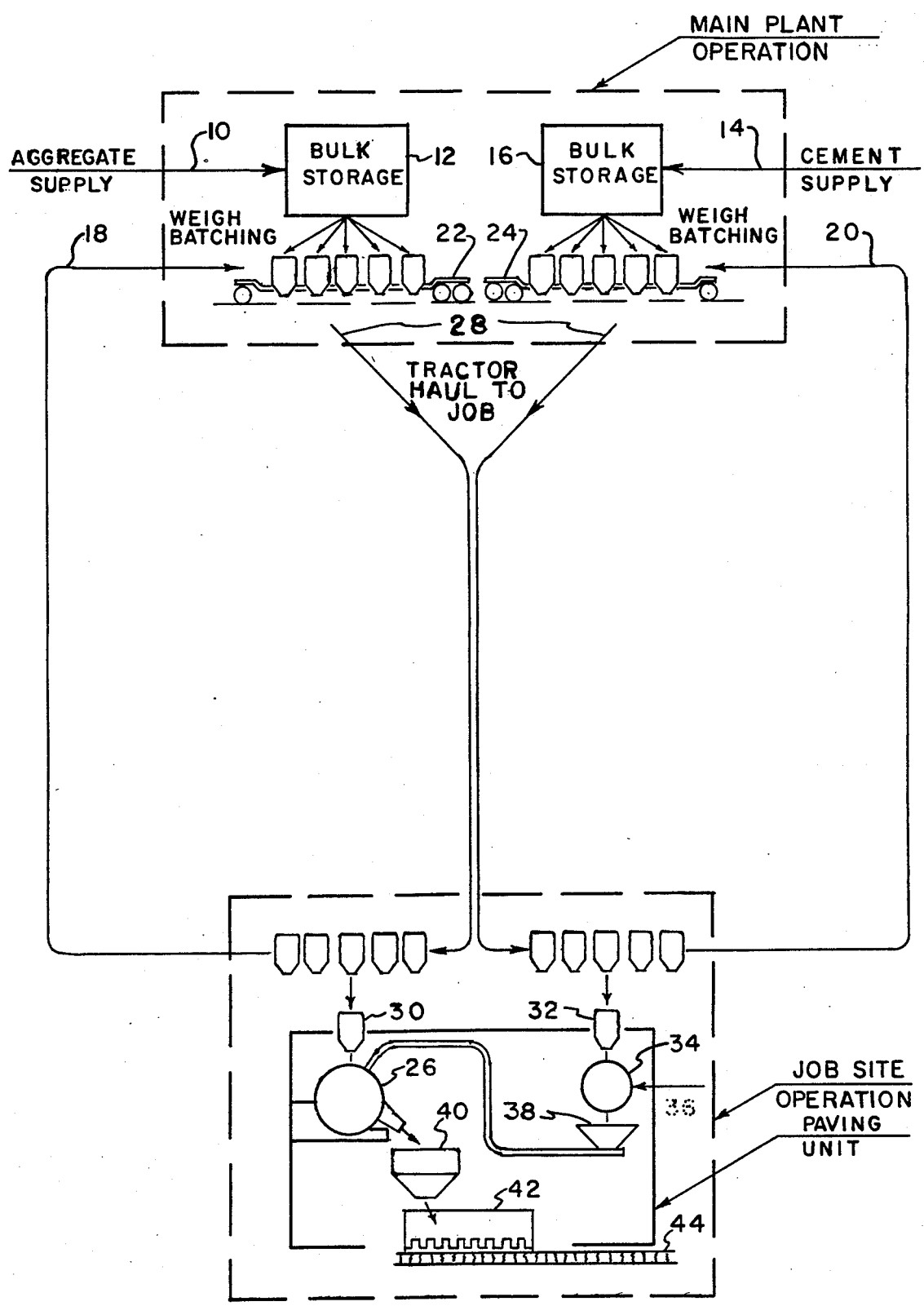

METHOD OF PRODUCING AND DISTRIBUTING A PERVIOUS CONCRETE PRODUCT

BACKGROUND OF THE INVENTION

1. Field of the Invention

This invention relates to a pervious concrete product of the type which allows liquid and particularly water to drain therethrough isotropically or in a substantially even distribution and the process of forming and distributing the resulting concrete product through transportation, mixing and distribution procedures and equipment which differ from conventional technique utilized in producing and forming Portland cement type concrete.

2. Description of the Prior Art

In the construction and building industry the term "concrete" is used generically to define a collection or aggregation of materials which together form a reasonably continuous solid. Prior art products include both natural concrete and a variety of synthetic concretes. The most common of such products being asphaltic concrete in which inert aggregates are mixed with a bituminous binding component, and Portland cement concrete. In Portland cement concrete the object is to obtain a continuous monolithic material of substantially uniform properties. In conventional and by far the majority of normal applications of concrete, voids and/or small discontinuities or inclusions of air are considered to be highly undesirable since these voids, etc. harmfully affect the operating or performance characteristics of the end concrete product.

However, in the specialized category of pervious or porous concrete such voids are intentional in the formation of the concrete product. While such porous concrete is generaly well known in the prior art, porous concrete suffers from inherent problems which make the overall product relatively undesirable. Such prior art porous concretes are generally considered of variable quality and indeterminate permability and thus unreliable or defective for controlled or specified construction applications.

The following U.S. Patents disclose prior art products and/or methods of forming concrete products or cementitious material which are generally applicable but clearly distinguishable from the product and process of the present invention, described hereinafter U.S. Pat. Nos.: 271,080, to Lynch; 358,288 to Moore; 1,665,104 to Martienssen; 3,196,122, to Evans; 3,240,736, to Beckwith; 3,360,493, to Evans; 3,439,450 to Richards; 3,477,979 to Hillyer; 3,687,021 to Hensley; 3,690,227 to Weltry; 3,870,422, to Medico; 2,130,498 to Klemschofski; and 3,822,229 to McMaster.

As evidenced by the prior art set forth above there is an obvious desirability and need for porous concrete products. Such products generally and/or theoretically would be much more efficient where drainage of water is desired pertinent to concrete product applications such as in highways, airports, parking facilities, bridge decks, etc.

However, products of the type disclosed in the above set forth U.S. patents frequently suffer from certain inherent disadvantages such as fracture when used under heavy load or stress conditions (commonly called ravelling) in roads, highways, and pavements where they are generally formed using substantially conventional concrete forming techniques or processes, with or without the application of additives to allegedly increase adhesion between the aggregate particles and improve other performance characteristics.

However, there is a great need in the construction and building industry, specifically in building roads, highways, etc. for a porous concrete having an even distribution of liquid flow therethrough and which can better provide for the load or stress conditions from high speed operation of automobiles or large vehicles such as trucks, airplanes or the like.

SUMMARY OF THE INVENTION

The present invention is directed toward a concrete product having a pervious or water permeable structure which includes a competent degree of physical strength, but which, as set forth above, permits liquids, particularly water, to pass through in any direction, and its preparation, placing and finishing to provide durable products.

Water, and any type of Portland cement including white cement or high alumina cement may be used in forming the subject product with or without coloring powders or additives. Furthermore, aggregate is utilized in the formation of the resulting pervious concrete products and may include inert components on any material normally used for the production of conventional Portland cement concrete. However, in considering the dimensional characteristics of the aggregate utilized it is important that the proportions of the various sizes of the particles must be such as to produce a desired degree of voids in the resulting concrete product. The discontinuity in size or grading is used to produce varying degrees of permeation (or passibility) of water through the resulting cured concrete product, and varying strength. However, experience dictates that the desirable overall dimensional characteristics and the relative proportions of particle size must be such that less than ten percent by weight of the overall aggregate is smaller in size than one-half the maximum particle size of the remaining aggregate.

While not necessary to accomplish the desired and intended operational characteristics, especially strength and desired permeability of the resulting pervious concrete product, any additives used in normal Portland cement concrete can also be used in the product of the subject invention.

In the formation of the pervious concrete product of the subject invention, an important procedural step thereof comprises the pre-mixing of the cement and water, in predetermined applicable quantities utilizing high energy techniques for the purpose of accomplishing a predetermined degree of hydration of the cement particles. Such degree of hydration is greater than the degree of hydration generally accomplished with conventional Portland cement type concrete but somewhat less than total hydration, or the amount of hydration achieved with certain existing techniques commonly known as wet milling. Such degree of hydration provides a resulting cementitious material batch which has a substantially continuous viscosity and a consistency which substantially reduces "bleeding" or the normal separation of water from the concrete particles as is common in the formation of conventional Portland cement slurries, grouts or like products.

The term high energy mixing can be used to define any type of mixing technique which accomplishes or effectively forces more intimate contact with the water and the cement particles. One technique utilized in the formation of the subject cementitious batch utilizes a high energy mixer which develops, due to the structural components and arrangement thereof, a controlled shear flow of the product during its mixing operation. Such shear flow can best be defined by a complex substantially counter and/or interruptive rotary flow path of various portions of the cement and water concurrently as the entire cementitious batch is being mixed. This high energy mixing takes place until continuous and consistent viscosity has been established to a sufficient degree to effectively eliminate separation or "bleeding" of the water from the cement particles.

Finally after pre-mixing, using the equivalent of high energy techniques as set forth above, the aggregate is mixed with the resulting cementitious material batch in a positive mechanical mixer which may be of conventional design.

Distribution of the resulting concrete product while still in a mobile state takes place through the provision of a first feeder facility or means which is disposed in direct communication with the mixing facility immediately set forth above. Accordingly, the viscous concrete product is transferred from the mixing facility to the distribution facility by mean of the feeder facility which is transferable in a mobile manner, therebetween. Distribution is thus accomplished as the concrete product is fed successively from the mixing facility to the feeder facility to the distribution facility. The distributer or distribution facility will discharge continuously any desired depth and width of paving up to the limits imposed by traffic regulations, etc.

Upon discharge the resulting concrete product is consolidated and finished to a uniform and even surface by percussive, vibratory and spring or weight loaded slip finishing plates as part of the distributer. Curing is allowed to occur for an optinum period of from five to seven days.

The invention accordingly, comprises the features of construction, combination of elements, and arrangement of parts which will be exemplified in the construction hereinafter set, forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

The single FIGURE of the subject invention induces a schematic flow diagram including the pictorial representation of the method of production and distribution of the product of the subject invention.

Similar reference characters refer to similar parts throughout the several views of the drawings.

DETAILED DESCRIPTION OF THE PREFERRED EMBODIMENT

In the preferred embodiment of the present invention, a sample of the pervious concrete product was formed as follows.

A predetermined quantity of Portland cement was continuously fed to a high energy mixing facility concurrently with the application thereto of predetermined quantities of water being brought into intimate contact with the cement particles through a spray facility. The quantities of cement and water were thereby mixed in a manner which accomplished a viscous shear flow thereby providing a predetermined degree of hydration of the cement particles which produced a resulting cementitious material batch having a continuous and consistent viscosity. The aforementioned resulting cementitious material batch served as a uniform slurry of high viscosity capable of uniformally coating and binding the individual particles of aggregate and preventing segregation of the cement-water component or concentration of the aggregate itself.

However, an important step in the process of forming the resulting concrete product was the mixing of the aggregate subsequently to forming of the highly viscous mixture of cement and water. Aggregate particle size was such that less than ten percent by weight of the total amount of aggregate utilized was of a particle size of less than half of the maximum particle size of the remaining quantity of aggregate, to obtain a maximum degree of permeability. Variations of this proportion will retain some permeability and increase compressive strength.

Mixture of the aggregate and the cementitious material batch or mixer was accomplished in a positive mechanical mixer which may be substantially of conventional design.

Distribution of the resulting concrete product while still in a highly mobile state is accomplished in the manner which will be described with reference to the accompanying drawing.

Aggregate is supplied by any conventional transportation facility 10 and stored in hoppers 12. Bulk cement supply and storage is similar as at 14 and 16. From bulk storage 12 and 16, aggregate and cement respectively are weigh-batched directly, 18 and 20 respectively, into a plurality of containers. The containers may be mounted in a trailer frame or like portable structure 22 in the case of the aggregate, and 24 in the case of the bulk cement. When charged, each aggregate container carries the material for one unit for charging into the positive mixer 26 operating at the job site. Each cement container is sized for a predetermined larger number of such batches (preferably 4). This ratio is adopted since it results in aggregate and cement containers of the same size so that the trailer frame or mobile facilities 22 and 24 may be interchangeable. When fully charged the containers and trailers are hauled by any applicable motor vehicle 28 to the job site. At such site, forklift trucks, or like transport facilities may transfer the individual containers 30 directly to the positive mixer 26 to charge the mixture. Synchronized with this action, like transports of the individual cement containers 32 are transferred to the high shear mixer facility 34.

With the addition of the controlled quantity of water, preferably in spray form, the preparation in 34 is completed and the entire batch is discharged into a pumping unit 38 of substantially conventional design. This pumping unit 38 discharges the slurry into mixer 26 which is activated and completes the mixing of the pervious concrete products for discharge into feeder 40. The resulting mixture is then transported to the distributor facility 42 for total lateral distribution of the product across the area to be paved or at which the resulting concrete is to be deposited.

Both feeder means or facility 40 and distributor facilities 42 into which the batch is fed by feeder facility 40 can be adjusted to suit the lateral width of paving. The design of feeder 40 permits a full batch of pervious concrete product to be progressively discharged across the working width of the distributor so that a uniform depth of concrete is maintained in the distributor facility 42 at all times during actual operation.

The distributor facility 42 is spring mounted and fitted with percussion units or a jolting mechanism so that a uniform flow of pervious concrete is forced through a flap controlled opening at the base. This opening can be adjusted in both width and height thus permitting a pavement of uniform dimension to be deposited at a steady rate as the distributor moves over the area to be paved. A plurality of finishing units or facilities which may be in the form of blades or like elements are pulled over the distributed concrete while exerting a heavy spring loaded or weighted vibratory pressure over the surface thereof. This is accomplished by attaching the finishing facilities to the rear of the distributor so that it may travel along therewith. The initial formation and finishing of the pervious concrete material is thereby completed allowing for a predetermined curing period to be applied and so as to give the resulting product its maximum strength and operational characteristics.

It should be noted that while the process of the present invention is described herein with reference to a batch type information of the formed cementitious material, the process can be performed on a continuous basis. Accordingly, it is contemplated to be within the scope of the present invention that cement particals can be discharged into a high energy mixing facility a mixed therein with water on a continuous basis. In addition the resulting concrete product can be formed continuously based on a continuous discharge of the constituent material into mixing with the subsequently supplied aggregate.

It will thus be seen that the objects set forth above, among those made apparent form the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A method of producing a pervious concrete product of the type which allows fluids to pass therethrough, said method comprising the steps of:
   (a) supplying a predetermined quantity of cement dependent on quantity and desired strength and performance characteristics of the resulting pervious concrete products,
   (b) supplying a predetermined quantity of water depending on said predetermined quantity of supplied cement,
   (c) continuously mixing together said predetermined quantities of cement and water to form a cementitious material utilizing high energy techniques, at least until said resulting cementitious material establishes a substantially consistent viscosity defined by separation of said water from said cement being substantially eliminated,
   (d) supplying a predetermined quantity of aggregate depending upon quantity and desired strength and performance characteristics of the resulting concrete product, and wherein the average size of individual aggregate is dependent on desired permeability of the resulting concrete product,
   (e) mixing said predetermined quantity of aggregate with said cementitious material subsequent to the mixing of said cement and water to form said pervious concrete product.

2. A method as in claim 1 further including continuously mixing said aggregate and cementitious material and distributing said concrete product at an area of application immediately from said point of continuous mixing.

3. A method as in claim 1 further comprising mixing said predetermined quantities of cement and water together utilizing high energy techniques and continuing said high energy mixing until a predetermined degree of hydration of the particles of cement is accomplished.

4. A method as in claim 3 further comprising continuing high energy mixing of said cement and water until said cementitious material is characterized by a predetermined and substantially continuous degree of viscosity.

5. A method as in claim 1 further comprising continuously supplying said predetermined quantities of cement and water to a mixing facility, spraying said water concurrently into mixture with said cement upon supplying of said cement to said mixing facility.

6. A method as in claim 1 wherein less than ten percent by weight of the supplied aggregate is smaller than one-half the average maximum particle size of said predetermined quantity of aggregate supplied.

7. A method as in claim 1 further including:
   (a) discharging said formed concrete product into a feeder means disposed and configured for transfer of said concrete product to the area of application, and
   (b) transfering said formed concrete product from said feeder means to distribution means disposed to distribute said concrete product over a predetermined surface area at the area of application.

8. A method as in claim 7 further comprising continuously distributing a flow of said concrete product in a mobile state in consistently sufficient quantities for delivery at a site of application to define a finished product of predetermined thickness and lateral dimension, finishing said applied concrete product concurrent to and immediately subsequent to distribution thereof.

* * * * *